United States Patent [19]

Bannister et al.

[11] 3,866,060

[45] Feb. 11, 1975

[54] ELECTRIC POWER SOURCE

[75] Inventors: Lawrence H. Bannister, Dedham; Richard H. Baker, Bedford, both of Mass.

[73] Assignee: Massachusetts Institute of Technology, Cambridge, Mass.

[22] Filed: Dec. 19, 1973

[21] Appl. No.: 426,269

[52] U.S. Cl. ..................... 307/43, 307/117, 321/15

[51] Int. Cl. ..................... H02m 3/00

[58] Field of Search ............. 307/11, 18, 44, 43, 45, 307/46, 48, 117, 109, 110; 321/15

[56] References Cited

UNITED STATES PATENTS 3,432,738 3/1969 Jensen ........................ 321/15

3,748,492 7/1973 Baker ........................ 307/117

*Primary Examiner*—Robert K. Schaefer

*Assistant Examiner*—M. Ginsburg

*Attorney, Agent, or Firm*—Arthur A. Smith, Jr.; Robert Shaw; Martin M. Santa

[57] ABSTRACT

An electric power source comprising N stages connected in cascade. Each stage includes voltage supply means connected along alternate conductive paths to an output terminal, thence to the next succeeding stage and, eventually, to an output terminal of the Nth stage. Switches connected in each stage determine which of the paths is conductive at any particular state of system operation, the switches being controllable, in part, by feedback between stages.

23 Claims, 10 Drawing Figures

ELECTRIC POWER SOURCE

The invention herein disclosed arose from work done pursuant to a contract with the United States Navy, Office of Naval Research.

The present invention relates to electric power sources that are modular in nature.

Reference may be made to applications for Ser. No. 256,811, filed May 25, 1972 (now U.S. Pat. No. 3,748,492) and Ser. No. 360,501, filed May 15, 1973 by Richard H. Baker, one of the present inventors, for background information relating to the present invention.

Further work has shown that a number of modifications can be made in the circuitry disclosed in the above-mentioned applications to improve, for some purposes, the performance of the power sources there described. Accordingly, it is an object of the present invention to provide novel modification of the systems of said applications, and, in particular to provide simplified circuitry, improved transient response, and improved power efficiency.

Still further objects are noted hereinafter and are particularly delineated in the claims.

By way of summary, the objects of the invention are attained by an electric power source or system that comprises N stages connected in cascade to form a parallel-series chain (PSC herein). Each stage includes supply voltage means (which can be a battery, solar cells, a capacitor, or a fuel cell, thermoelectric device or other d-c supply connected between first and second terminals of the stage, the supply voltage means being connected along alternate conductive paths to a third terminal of the stage, thence to the next stage, etc. to the Nth stage. Switch means in the paths determines which path is conductive at any particular state of system operation. The switch means is controlled, in part, by d-c and/or a-c feedback connected between stages except in one embodiment wherein the d-c feedback is a bootstrap configuration in which the feedback loop can be confined to the stage controlled.

The invention is hereinafter described with reference to the accompanying drawing in which.

Figure 1:
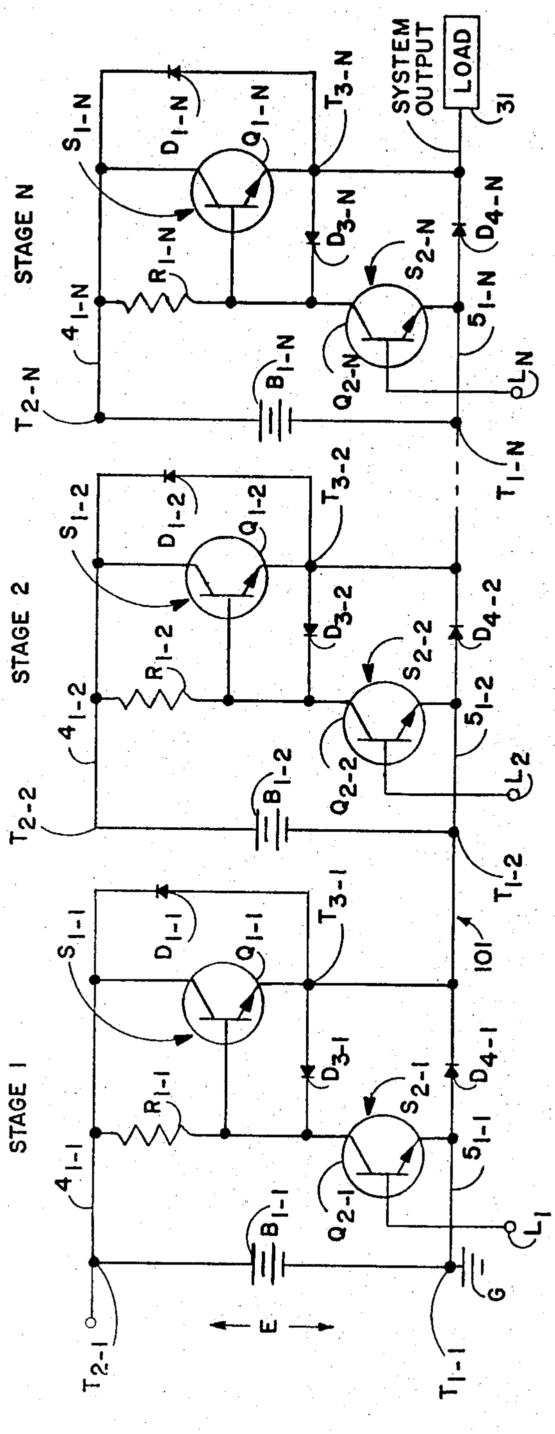
FIG. 1 is a schematic circuit-diagram of an electric power source or system having a plurality of N stages connected in cascade.

Before going into a detailed explanation of the invention, a few preliminary remarks are in order. The invention is directed to an electrical power source that consists of a plurality of cascaded stages and is sometime referred to herein as a parallel-series chain (PSC). Each stage, generally speaking, is like every other stage of the chain, except the first stage (and sometimes the last stage) which may differ in form slightly from the other stages in the system. The general type system is disclosed in great detail in the previous applications where, among other things, it is noted that the multistage concept can be employed to obtain very high voltage, programmable voltage, voltages in a matrix system, etc. The order of elements in a stage depends on the somewhat arbitrary choice of where the stage starts in the system and where the stage stops. In order to maintain some continuity of language between this and the prior applications, the same arbitrary lumping of elements in a stage is followed here. With reference now, briefly, to FIG. 1 the PSC 101 thereshown consists of three stages 1, 2 . . . N of an N-stage system. Stage 1, for example, begins at the terminals labeled $T_{1-1}$ and $T_{2-1}$, and ends at the terminal labeled $T_{3-1}$ (this approach is used throughout); and the other stages are similarly delineated. The PSC 101 can be employed to increase a voltage; in this mode of operation, the terminal designated $T_{3-N}$ is usually connected to the load. In the system of FIG. 1 the change in the output voltage at the terminal $T_{3-N}$ can be up to N.E. In some situations the output can be taken at terminal $T_{2-N}$, the voltage change at the terminal $T_{2-N}$ being (N–1) E volts; and the Nth stage switches are not needed. Sometimes, in the following discussion, the circuitry is treated as a three-stage source for convenience, but it is, in fact, an N– stage source. It should be pointed out that the PSC 101 can be used with other parallel-connected like systems to feed a load and, in this regard, high re-charge rates of the order of 20 kilocycles and up of the capacitors in the further embodiments permit, by an overlapping of output pulses, the use of relatively small capacitances as the voltage sources labeled $C_{1-2}$ . . . $C_{1-N}$ in FIGS. 2–7.

The electric system 101 is shown comprising a plurality of N stages 1, 2 . . . N connected in cascade, each stage including respectively a first electrical terminal $T_{1-1}$, $T_{1-2}$ . . . $T_{1-N}$, a second electrical terminal $T_{2-1}$, $T_{2-2}$ . . . $T_{2-N}$ and a third electrical terminal $T_{3-1}$, $T_{3-2}$ . . . $T_{3-N}$. Supply voltage means, which in FIG. 1 comprises a battery $B_{1-1}$ . . . in each stage, is connected between the respective first electrical terminal $T_{1-1}$ . . . and the second electrical terminal $T_{2-1}$ . . . Each battery supplies E volts. (It should be noted that the batteries or other supply voltage means (e.g., capacitors) need not all have outputs of E volts and in some situations are different in order to allow increases of other than E volts at the output.) First semiconductor switch means $S_{1-1}$, that comprises a bipolar, n-p-n transistor $Q_{1-1}$ . . . , is connected in a first electrical path $\mathbf{4}_{1-1}$ . . . of each stage between the first electrical terminal and the third electrical terminal; the second semiconductor switch means $S_{2-1}$ . . . , that comprises a bipolar, n-p-n transistor $Q_{2-1}$ . . . , is connected in a second electrical path $\mathbf{5}_{1-1}$ . . . between the first electrical terminal and the third electrical terminal of each stage. (The first semiconductor switch is also referred to herein as the $S_1$ switch to denote the upper switch in the figures and the second semiconductor switch is sometimes referred to as the $S_2$ switch.) A diode $D_{3-1}$ . . . in each stage is connected to pass current (in its normally forward direction of current flow) from the third terminal $T_{3-1}$ . . . , through the respective second transistor $Q_{2-1}$ . . . , to the first terminal $T_{1-1}$ . . . of the stage. Means is provided, as hereinafter discussed, to control the state of conduction of the $S_1$ and $S_2$ switches of the system 101.

The explanation in this paragraph is a simple explanation of an N-stage system. In FIG. 1 the third electrical terminal $T_{3-1}$ of stage 1 is connected to the first electrical terminal $T_{1-2}$ of stage 2, the third electrical terminal $T_{3-2}$ of stage 2 is connected to the first electrical terminal of stage 3 and so forth to the N-th stage.

The third electrical terminal $T_{3-N}$ of the N-th stage (or the second electrical terminal $T_{2-N}$, FIG. 3) is the output of the system 101 and is connected to a load 31. In the system 101 the terminal $T_{1-1}$ only is grounded (ground here denotes system ground but it can be actual earthing); the remainder of the system 101 can float with respect to system ground, as later discussed. If it is assumed that the $S_1$ switches are closed, or conducting, and the $S_2$ switches are open, or non-conducting, then the batteries $B_{1-1}$ . . . are connected in series and a voltage of NE is connected to the load 31. If, now, the switches $S_{2-1}$, $S_{2-2}$ . . . $S_{2-N}$ are made to conduct by an appropriate signal, applied to points $L_1$, $L_2$ . . . $L_N$, respectively, the switches $S_{2-1}$, $S_{1-2}$ . . . $S_{1-N}$ will stop conducting, as now explained mostly with reference to the first stage. It is assumed for the explanation in this paragraph that initially all the $S_1$ switches are closed and the $S_2$ switches open. In this condition, a voltage, which for present purposes is 3E, is applied across the load 31. It can be assumed also that no ON bias is applied to any of the terminals $L_1$, $L_2$ . . . $L_N$. In this situation a plus voltage pulse $40_1$ is applied to the $L_1$ terminal by a memory or master controller 39 in FIG. 10, turning the transistor $Q_{2-1}$ ON; this turns OFF the transistor $Q_{1-1}$ and causes the diode $D_{3-1}$ to conduct which drops the voltage at $T_{3-1}$ to ground potential. At this juncture the transistor $Q_{2-2}$ is biased ON by a pulse $40_2$ from the controller 39, which turns OFF the transistor $Q_{1-2}$ etc. to the Nth stage. Alternatively the points $L_2$ . . . $L_N$ could have been biased plus originally so that when $L_1$ was biased plus, as above, the remaining stages would have been switched in an avalanche mode; in avalanche operation removing the plus bias from $L_1$ switches the transistor $Q_{2-1}$ OFF, turning ON the transistor $Q_{1-1}$, turning OFF the transistor $Q_{2-2}$ and the transistor $Q_{2-1}$ ON etc. to the Nth stage. In this way the conductive paths $4_{1-1}$ . . . and $5_{1-1}$ . . . are rendered conductive and non-conductive as alternate conditions of system operation, thereby to apply a voltage pulse to the load 31 and to remove the pulse. The diode $D_{1-1}$ . . . in each stage acts as a bypass diode for the associated transistor $Q_{1-1}$ . . . to make the conducting paths $4_{1-1}$ . . . bilateral in order to discharge any load capacitance, be it parasitic, stray or load in the down condition; that is, when the $S_2$ switches are closed. The diode labeled $D_{4-1}$ . . . in each stage acts, for example, when a stage is OFF (that is the $S_2$ switch of the stage is closed) but the remaining stages are ON (that is, the $S_1$ switches are closed). In this condition, for example if $S_{1-1}$ and $S_{1-N}$ are closed but $S_{1-2}$ is non-conducting, current will pass through $S_{1-1}$, through $D_{4-2}$ etc. to the terminal $T_{3-N}$, as before. It should be noted that the circuit of FIG. 1 employs n-p-n transistors. It is of course possible and practical to use only p-n-p transistors so that negative-going voltages are applied to output load. This dual circuit concept applies to each figure and discussion herein.

Figure 2:
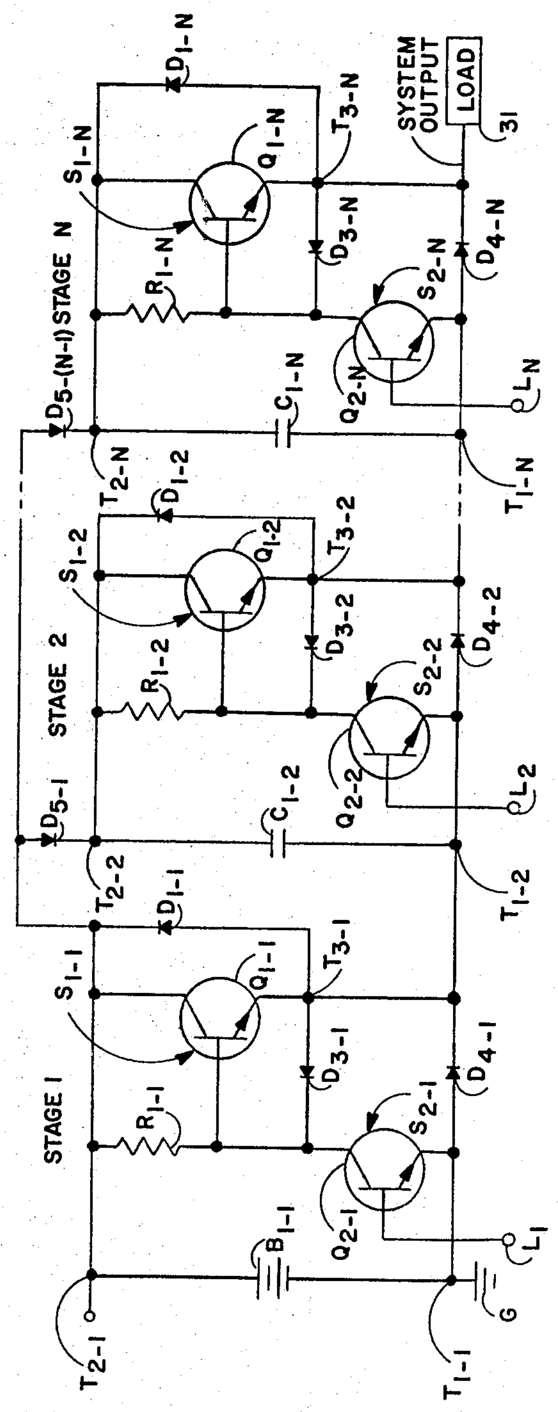
FIGS. 2–7 are schematics of modifications of the system of FIG. 1.

In FIG. 2, the batteries $B_{1-2}$ . . . $B_{1-N}$ of FIG. 1 are replaced by capacitors $C_{1-2}$ . . . $C_{1-N}$, respectively. The supply voltage means of stage 1 is still the battery $B_{1-1}$ except that in the embodiment of FIG. 2 (and later as explained in connection with FIGS. 3–7) the battery $B_{1-1}$ is also the system power supply. It will be appreciated that the battery $B_{1-1}$ can be replaced by a rectified source, as is explained in the earlier applications. At any rate, the capacitors $C_{1-2}$ . . . $C_{1-N}$ are charged in parallel through parallel connected diodes $D_{5-1}$ . . . $D_{5-(N-1)}$, respectively, when the $S_2$ switches are closed and are discharged in series when the $S_1$ switches are closed, as alternate conditions of system operation. It will be appreciated that if the load 31 in FIG. 2 is replaced by a high voltage d-c source, and the battery $B_{1-1}$ is replaced by a load (with appropriate switches, as explained in said U.S. Pat. No. 3,748,492) that the capacitors $C_{1-N}$ . . . $C_{2-N}$ can be charged in series and discharged in parallel. Some modification of FIG. 2 would be necessary, e.g., removal of diodes $D_{5-1}$ . . . . The step-down function applies to the circuits of FIGS. 3–7 also. Anyway, in the step-up mode of operation which is the mode discussed hereinafter, the capacitors $C_{1-2}$ . . . $C_{1-N}$ are charged in parallel nearly to the voltage E and then connected in series across the load 31.

Figure 3:
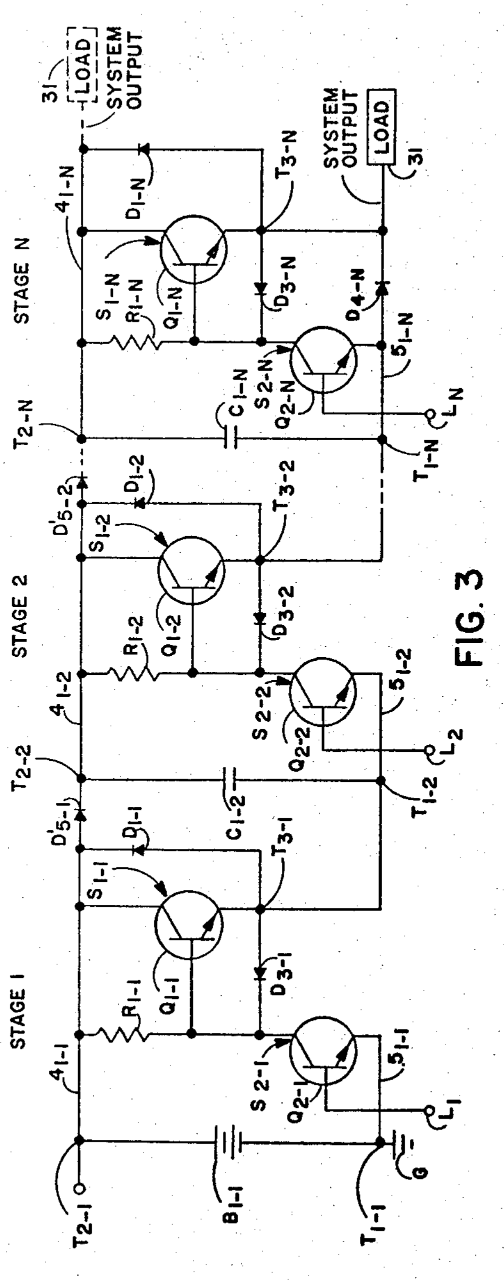

The embodiment of FIG. 3 is a slightly modified version of FIG. 2. In FIG. 3 the diodes $D_{5-1}$ . . . $D_{5-(N-1)}$ are replaced by series-connected diodes $D'_{5-1}$, $D'_{5-2}$ etc. which pass current from stage 1 to stage 2, ect. to stage N. Whereas in the system of FIG. 2, the diodes at the upper end of the PSC such as the diode $D_{5-(N-1)}$ must be high-voltage (but low-current) devices, in the system of FIG. 3, the diodes $D'_{5-1}$, etc. may all be low-voltage devices. In addition, the diodes $D'_{5-1}$ . . . act to make the $S_2$ switches bilateral in that they perform the function of the diodes $D_{4-1}$ . . . in FIG. 2; that is, they allow current to flow from stage 1 to stage N in FIG. 3 even though some $S_2$ switches are non-conducting.

Figure 4:
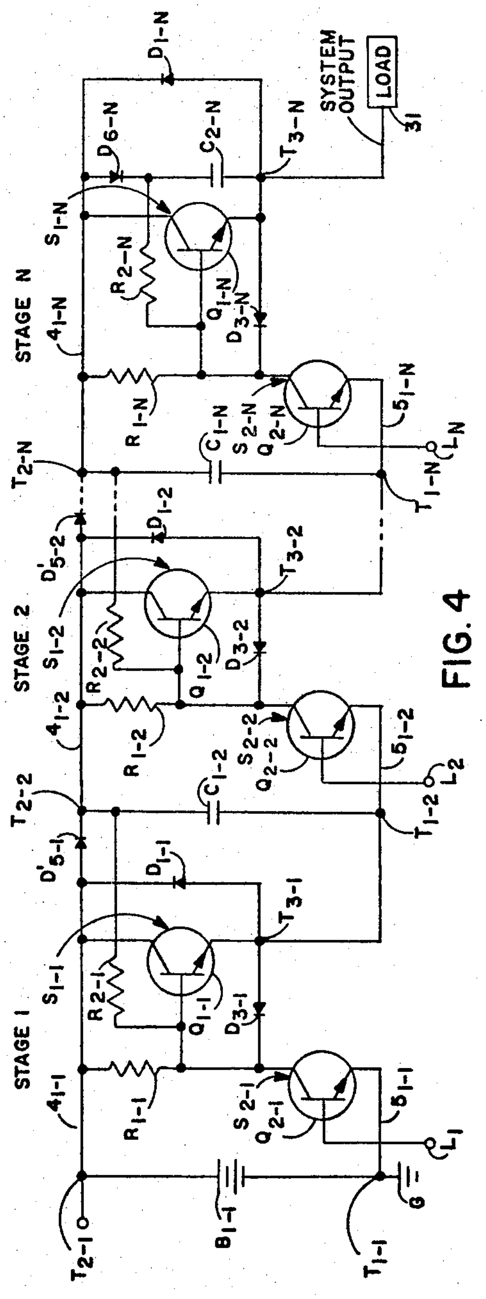

In the circuits of FIGS. 2 and 3, the rise time of the pulse output of the PSC at the output terminal $T_{3-N}$ is determined by resistors $R_{1-1}$, $R_{1-2}$ . . . $R_{1-N}$ and the circuit stray capacitance. These resistors must have relatively large resistance to minimize unwanted discharge of the capacitors $C_{1-2}$ . . . $C_{1-N}$; so even small values of stray capacitance will cause the PSC to operate relatively slowly. To circumvent this problem, the systems shown in FIGS. 4–7 contain feedback. In FIG. 4, d-c feedback is provided in the form of resistors $R_{2-1}$, $R_{2-2}$ . . . between stages. Thus, for example, the d-c feedback between stages 1 and 2 comprises the resistor $R_{2-1}$ connected to feed a signal from the high side of the supply voltage means $C_{1-2}$ of stage 2 to the input of the first transistor $Q_{1-1}$ of the next preceding stage, in this case, stage 1. The resistor $R_{2-1}$ is connected to the top of high-voltage end of the capacitor $C_{1-2}$ of the next succeeding stage; since, in this circumstance, the base of the transistor $Q_{1-1}$ and the top (at terminal $T_{2-2}$) of the capacitor $C_{1-2}$ move sympathetically, the voltage across the resistor $R_{2-1}$ is sensibly constant and the electric current through the resistor $R_{2-1}$ is sensibly constant. Similarly, the resistors $R_{2-2}$ etc. provide constant current sources which serve to charge rapidly the PSC stray capacitances and hence serve to make the circuit operate much more rapidly than the circuits of FIGS. 1–3. The d-c feedback discussed in this circuit is a bootstrap configuration wherein, for example, the output of the transistor $Q_{1-1}$ is kept at a fixed potential relative to the input thereof by relating the input to the $T_{2-2}$ side of the capacitor $C_{1-2}$. The capacitor $C_{1-2}$ performs a dual function, that is, it is an energy storage element and a potential reference for the bootstrap circuitry. The d-c feedback is an interstage connection, except that is, for the Nth stage wherein a capacitor $C_{2-N}$ and diode $D_{6-N}$ in the Nth stage provides the necessary reference voltage for the bootstrap configuration. The capacitor $C_{2-N}$ can be much smaller than the capacitors $C_{1-2}$ . . . as later noted in connection with the explanation in FIG. 6. The resistors R 1-1, $R_{1-2}$ . . . $R_{1-N}$ may be eliminated, but do serve to improve switching times slightly.

Figure 5:
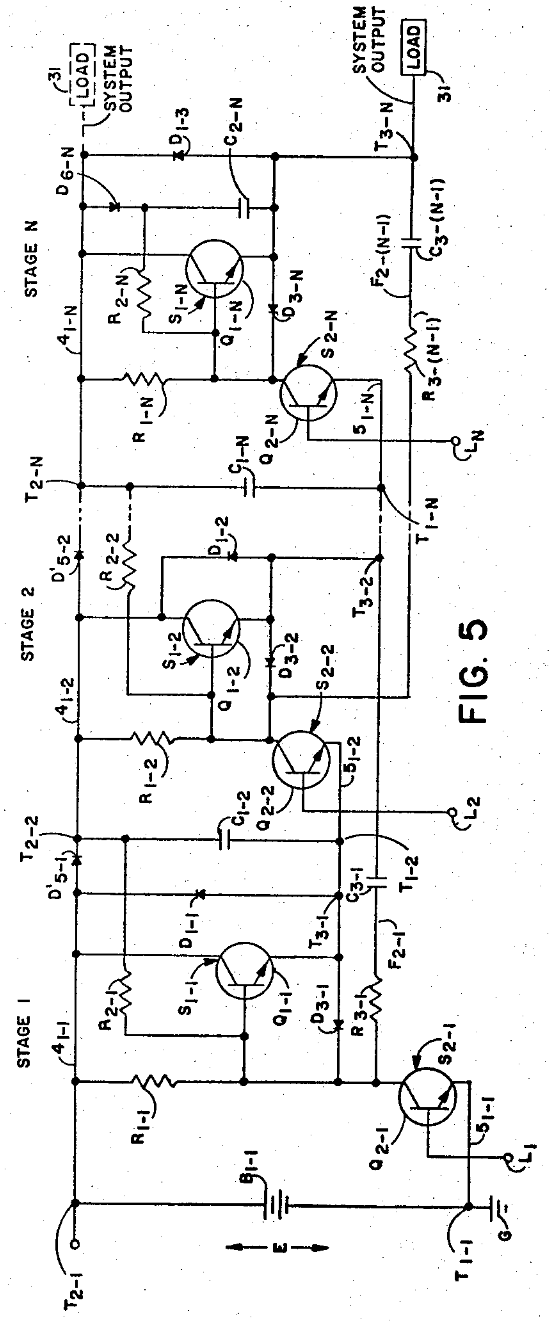

The PSC in FIG. 5 contains, in addition to the circuit elements of FIG. 4, a-c feedback connected to feed a signal from the output of one stage to the input of the first transistor of the next preceding stage. The embodiment of FIG. 5, like that in FIG. 4, contains three stages of an N-stage system. Since the a-c feedback (like the d-c feedback of FIG. 4) is between stages, there are N–1 feedbacks in the system. In FIG. 5 two a-c feedbacks $F_{2-1}$ and $F_{2-(N-1)}$ are shown comprising respectively a resistor $R_{3-1}$ and series capacitor $C_{3-1}$, in combination, and a resistor $R_{3-(N-1)}$ and series capacitor $C_{3-(N-1)}$, in combination. The feedback $F_{2-1}$ is connected from the output terminal $T_{3-2}$ of stage 2 to the input of the first transistor $Q_{1-1}$ of stage 1; and the feedback $F_{2-(N-1)}$ is similarly connected. In the circuit of FIG. 5, the d-c feedback works as before with a gain less than unity; the a-c feedback has a gain greater than unity. The importance of a-c feedback is now explained with reference to the first two stages.

When the transistor $Q_{2-1}$ is switched OFF in the manner before discussed, for example, the base of the transistor $Q_{1-1}$ rises from ground to E volts and the terminal $T_{3-1}$ rises from ground to E volts. Similarly, $Q_{2-2}$ is switched OFF and the terminal $T_{3-2}$ rises from ground to 3E volts. The a-c feedback capacitor $C_{3-1}$ therefore causes a transient current through the resistor $R_{3-1}$ which drives the circuit of stage 1 in the desired direction. The further interstage a-c feedback circuits between the further stages of the N-stage system function similarly. As described in connection with FIG. 4, the resistances $R_{1-1}$ etc., serve only to improve the switching time and need not be used. Typical circuit elements in an actual 250 volt-per-stage system: all transistors are 2N5099; resistors $R_{2-1}$ . . . are 50 l megohms; resistors $R_{3-1}$ . . . are one megohm; capacitors $C_{1-2}$ are 0.33 microfarads; all diodes are 1 N5623; and capacitors $C_{3-1}$ . . . are 470 picofarads. A circuit employing these elements in a sixteen stage system provides square wave pulses of 4000 volts, the pulse rise and fall times being 100 microseconds and the pulse repetition rate being at least the order of 500 Hz.

Figure 6:
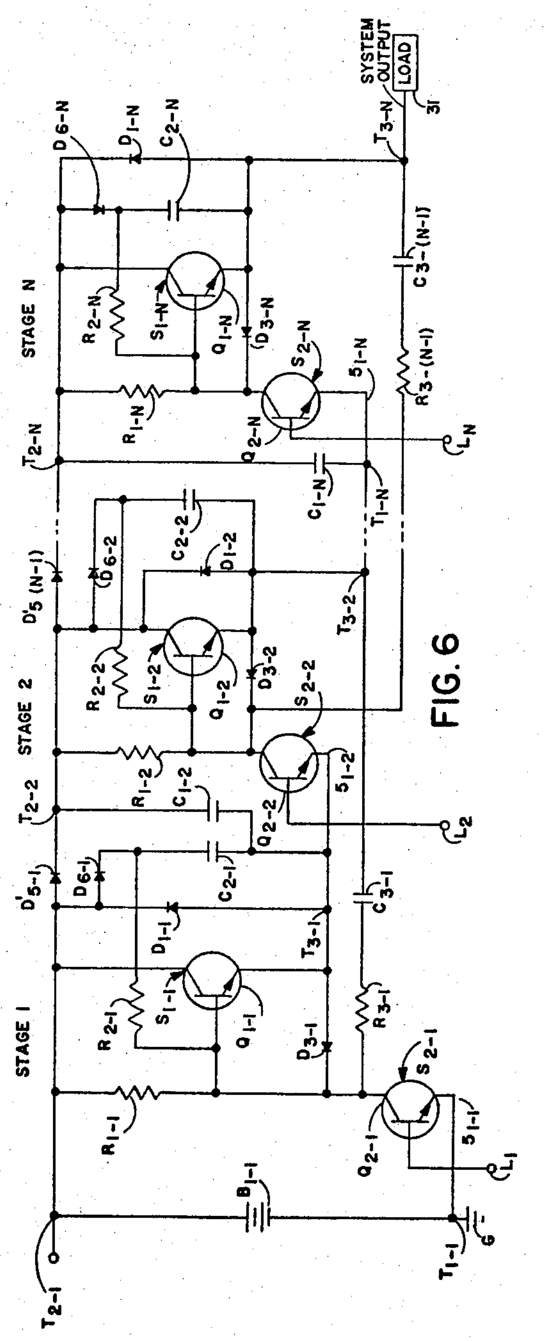

The circuit of FIG. 6 includes, in addition to the elements of FIG. 5, a diode $D_{6-1}$ . . . in each stage and a cpacitor $C_{2-1}$ . . . , the diode and the capacitor in the Nth stage being the elements $D_{6-N}$ and $C_{2-N}$ before discussed. These are connected in the bootstrap configuration before noted to provide the d-c feedback. The advantage of this modification is that feedback current is not taken from the energy storage capacitors that feed the load 31. Hence smaller capacitors can be used without causing droop at the output.

Figure 7:
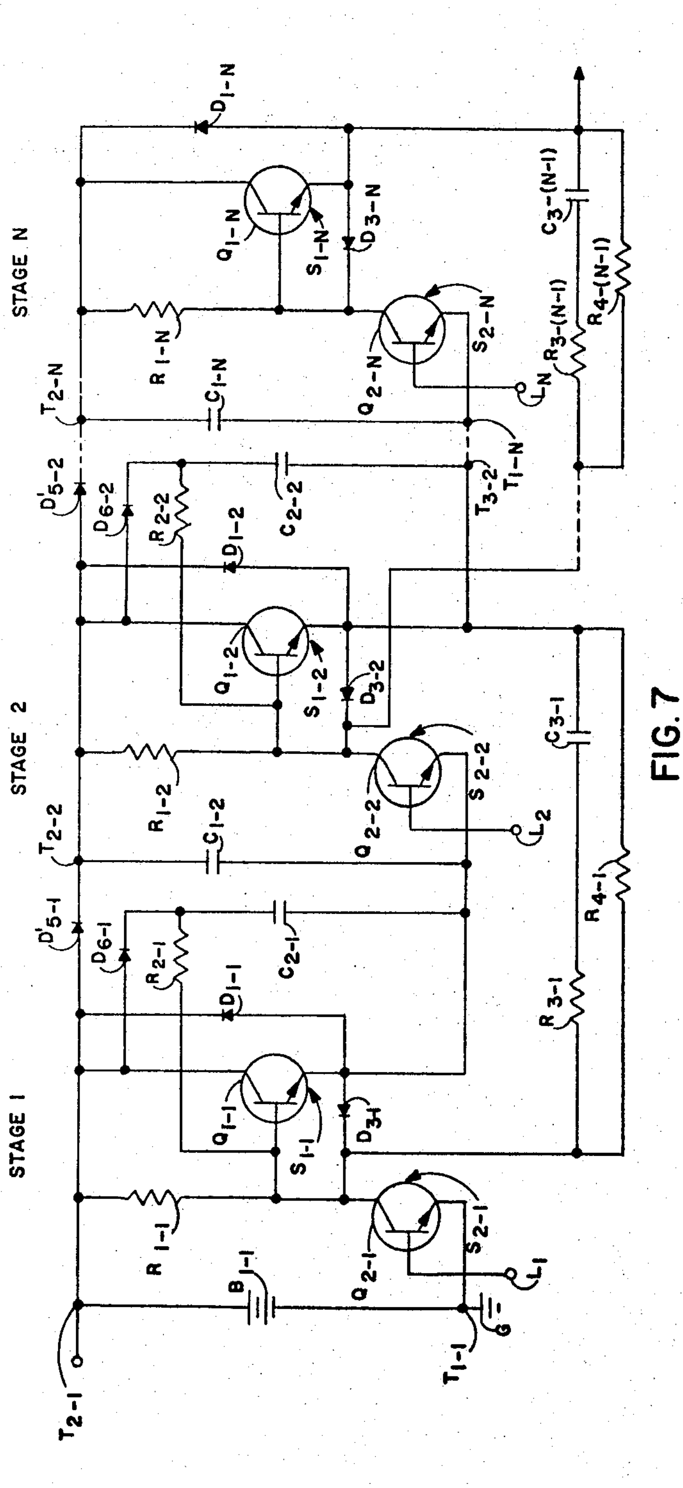

The circuit of FIG. 7 is similar to that of FIG. 6 except that it contains both a-c feedback and d-c feedback from the output of the next succeeding stage as input to the first transistor of the next preceding stage. The d-c portion of the feedback is provided by the resistors shown at $R_{4-1}$ . . . $R_{4-(N-1)}$ in FIG. 7 and the gain thereby provided is greater than unity. The d-c feedback, which in the embodiment of FIG. 7 is the second d-c feedback in the circuit, is connected for example, between the terminal $T_{3-2}$ and the base of the transistor $Q_{1-1}$ in the same manner as is the a-c feedback. With this arrangement, the current in the resistors $R_{2-1}$ etc. can be reduced by using larger values of resistance $R_{2-1}$ etc. so that the quiescent power dissipation (when the switches $S_{2-1}$ etc. are ON) can be much reduced without sacrificing load driving capability.

Figure 8:
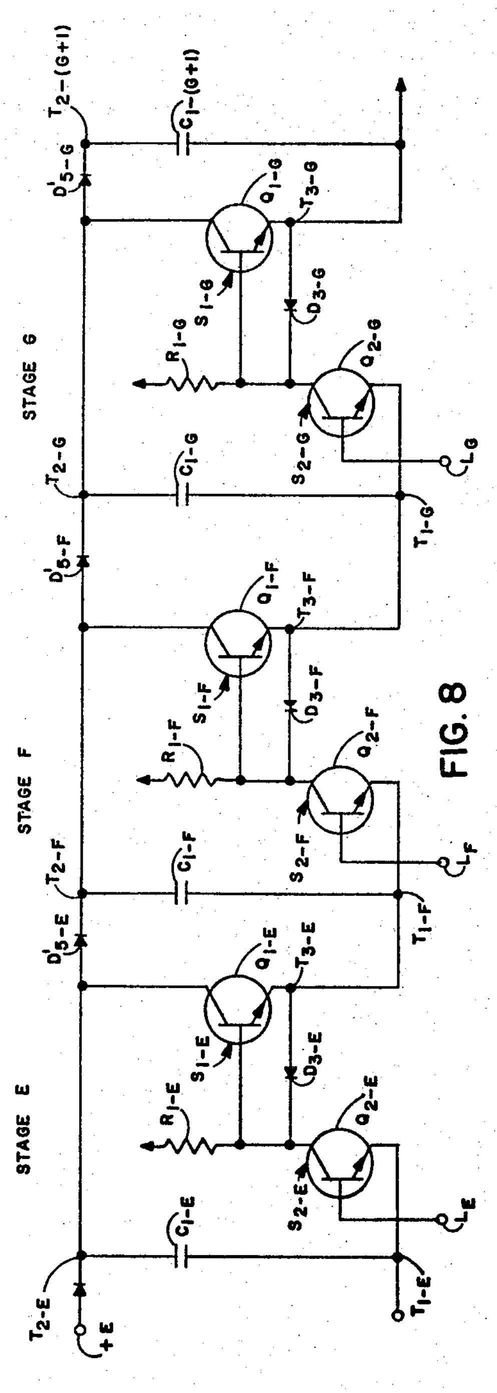
FIG. 8 shows schematically three intermediate stages of an N-stage system.
Figure 9:
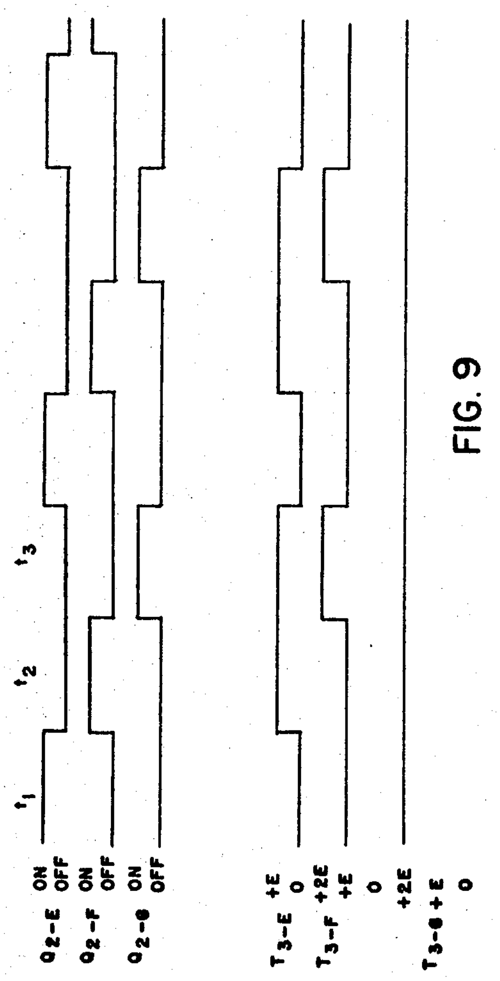
FIG. 9 is a timing and voltage output of the three-stage system of FIG. 8.

The system of FIG. 8 comprises three identical intermediate stages E, F and G of a PSC, like the system above described, said stages being used here in conjunction with the timing diagram of FIG. 9 to describe a ripple charging scheme. The three stages shown comprise capacitors $C_{1-E}$, $C_{1-F}$ and $C_{1-G}$, which perform the same functions as the capacitors $C_{1-2}$ . . . , and transistors $Q_{1-E}$ . . . , $Q_{2-E}$ . . . which are like the transistors $Q_{1-1}$ . . . and $Q_{2-1}$ . . . before discussed. The charge applied to the capacitors $C_{1-E}$ . . . is again assumed to be E volts. External control means connected to the bases of transistors $Q_{2-E}$, $Q_{2-F}$, and $Q_{2-G}$ cause these transistors to conduct sequentially in time intervals $t_1$, $t_2$, and $t_3$ respectively in FIG. 9. This cycle is repeated indefinitely. While transistor $Q_{2-E}$ is conducting, terminal $T_{3-E}$ is at the same potential as the emitter connection of the transistor $Q_{2-E}$, and while the transistor $Q_{2-E}$ is non-conducting, the terminal $T_{3-E}$ is at a potential of E relative to the emitter connection of the transistor $Q_{2-E}$. Similarly, while the transistor $Q_{2-F}$ is conducting, terminal $T_{3-F}$ is at the same potential as the terminal $T_{3-E}$ and while the transistor $Q_{2-F}$ is non-conducting, the terminal $T_{3-F}$ is at a potential of E relative to terminal $T_{3-E}$. Similarly, while transistor $Q_{2-G}$ is conducting, terminal $T_{3-G}$ is at the same potential as the terminal $T_{3-F}$ and while the transistor $Q_{2-G}$ is non-conducting, the terminal $T_{3-G}$ is at a potential of E relative to the terminal $T_{3-F}$. So, as shown in FIG. 9, the terminal $T_{3-E}$ alternates between a potential of 0 and E relative to the emitter of the transistor $Q_{2-E}$; the terminal $T_{3-F}$ alternates between a potential of E and 2E relative to the emitter of the transistor $Q_{2-E}$, while terminal $T_{3-G}$ remains at a steady state potential of 2E volts relative to the emitter of the transistor $Q_{2-E}$. Now, while the transistor $Q_{2-E}$ is conducting, in the time interval $t_1$, the capacitor $C_{1-F}$ is recharged from the system power supply which can be the battery $B_{1-1}$ as before mentioned; while the transistor $Q_{2-F}$ is conducting, in the time interval $t_2$, the capacitor $C_{1-G}$ is recharged from capacitor $C_{1-F}$; and while the transistor $Q_{2-G}$ is conducting, in the time interval $t_3$, the capacitor $C_{1-(G+1)}$ is recharged from the capacitor $C_{1-G}$. So, during each complete switching cycle, comprising the time intervals $t_1$, $t_2$, and $t_3$, charge is transferred sequentially from the system power supply to the capacitor $C_{1-F}$, thence to capacitor $C_{1-G}$ and thence to capacitor $C_{1-(G+1)}$. In other words, the storage capacitors $C_{1-F}$ . . . are intermittently refreshed to compensate for the charge lost due to current flowing in the load or internally in the circuits. Thus, the terminal $T_{3-G}$ remains at a steady state potential of 2E and the terminal labeled $T_{2-(G+1)}$ remains at a steady state potential of 3E. It will be appreciated that the ripple charging sequence can be extended to any desired number of stages and that the emitter of the transistor $Q_{2-E}$ can be connected to ground as the first stage of a PSC but may be connected to any other fluctuating or constant voltage derived, for instance, from a transient operated PSC of the type described previously or from a ripple operated block of the type described here.

Figure 10:
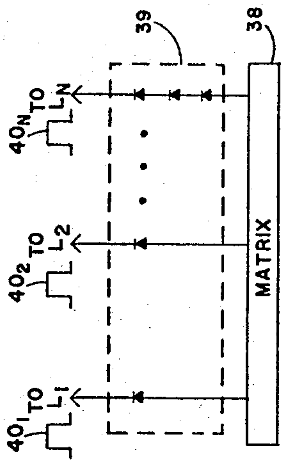
FIG. 10 shows schematically and in block diagram form, a control circuit for the systems of the other figures.

Control of the foregoing systems can be effected by the circuitry of FIG. 10. In FIG. 10 the control pulses $40_1$ . . . are supplied by a matrix 38 through diodes to the inputs $L_1$ . . . of the second transistors $Q_{2-1}$ . . . , respectively. The mechanism by which the circuit 101 in all its variations can be switched from a parallel mode wherein the $S_2$ switches are closed or conducting to a series mode wherein the $S_1$ switches are conducting depends on a number of factors that include, among other things, magnitude of the output voltage, changes needed in that voltage, ect. Thus, at voltages of the order of 10,000 volts or less, the diodes shown in FIG. 10 can be connected to $L_1, L_2 \ldots L_N$, but at some high voltage light actuated memories or the like as described in U.S. Pat. No. 3,748,492, might be preferable, especially at the high-end of the PSC to isolate or float the high-end stages from ground.

In this and the previous applications the need, in most situations, to have bilateral conducting paths $4_{1-1}$ . . . and $5_{1-1}$ . . . which are made such by bilateral switches at $S_1$ and $S_2$, is stressed. However, in embodiments like FIGS. 4–7 wherein resistor $R_{1-1}$ etc. provide positive feedback, the transistors $Q_{1-1}$ etc. are biased in the inverted mode when the $S_1$ switches are ON; by choosing transistors that have an adequate inverted $\beta$, diodes $D_{1-1}$ etc. can be eliminated.

In connection with the explanation with reference to FIG. 5, particular circuit values are mentioned for a 250 volt/stage PSC. It should be noted that in that circuit the output voltage can be varied only in 250 volt steps. There are situations where it is desirable to vary the output voltage in smaller increments. This can be accomplished by charging some of the storage units to less than 250 volts. In the actual apparatus discussed in connection with FIG. 5, the last stage of the PSC consists of three 80-volt stages which are light-actuated for ease of control. These three lower-voltage stages or substages are charged in parallel to 80 volts and one or more are connected in the circuit in the series connection depending upon the system output voltage needed.

As previously noted, the designation of terminals in a stage, the designation of input and output, and the designation of particular elements in a stage is arbitrary. Thus, for example, stage 1 in FIG. 4 could be considered to exclude $B_{1-1}$ but to include $C_{1-2}$. In this situation the d-c feedback would be all within stage 1 as it is, in fact, in the last stage of FIG. 4 and all the stages of FIG. 6. Also, with this element grouping the stage could be considered to be a four-electrical-terminal stage, the four terminals being $T_{1-1}$, $T_{2-1}$, $T_{1-2}$ and $T_{2-2}$, since, in fact, $T_{3-1}$ and $T_{1-2}$ are common points in all disclosed embodiments.

Modifications of the invention herein disclosed will occur to persons skilled in the art and all such modifications are deemed to be within the spirit and scope of the invention as defined by the appended claims.

What is claimed is:

1. An electric system that comprises a plurality of N stages connected in cascade, each stage including supply voltage means connected along two alternate conductive paths to an electric output terminal of the stage, thence to the next succeeding stage and, eventually, to the electric output terminal of the Nth stage, switch means in each stage being connected and operable to determine which of the two paths is conductive at a particular state of system operation; and feedback means connected between said stages and operable to control, in part, said switch means.

2. An electric system as claimed in claim 1 in which said feedback means is d-c feedback.

3. An electric system as claimed in claim 2 in which the d-c feedback means comprises a resistance connected to produce positive feedback with a loop gain less than unity.

4. An electric system as claimed in claim 1 in which the switch means comprises a first transistor and a second transistor, said feedback means being d-c feedback and being connected to feed a signal from the supply voltage means of one stage to the input of first transistor of the next preceding stage.

5. An electric system as claimed in claim 1 in which the switch means comprises a first transistor and a second transistor, said feedback means being a-c feedback and being connected to feed a signal from the output of one stage to the input of the first transistor of the next preceding stage.

6. An electric system as claimed in claim 1 in which the switch means comprise a first transistor and a second transistor and in which the feedback means comprises a d-c feedback circuit from one side of the supply voltage means of the next succeeding stage connected as input to the first transistor of the next preceding stage and an a-c feedback circuit connected from the output of one stage as input to the first transistor of the next preceding stage.

7. An electric circuit as claimed in claim 6 in which both the first transistor and the second transistor are the same conductivity type.

8. An electric system as claimed in claim 1 in which the switch means in each stage comprises a first transistor and a second transistor and in which the feedback means comprises both an a-c feedback circuit and a d-c feedback circuit connected from the output of one stage as input to the first transistor of the next preceding stage.

9. An electric system as claimed in claim 1 in which the switch means in each stage comprises a first transistor and a second transistor, which includes memory means associated with each stage connected to provide a control signal to determine the state of conduction of the second transistor of the stage, and in which the feedback means is connected to control the state of conduction of the first transistor.

10. An electric system that comprises a plurality of N stages connected in cascade, each stage including: a first electrical terminal, a second electrical terminal and a third electrical terminal, supply voltage means connected between the first electrical terminal and the second electrical terminal, first semiconductor switch means connected in a first electrical path between the second electrical terminal and the third electrical terminal, second semiconductor switch means connected in a second electrical path between the first electrical terminal and the third electrical terminal; and means to control the conductive state of the first semiconductor switch means and the second semiconductor switch means to render conductive the first electrical path and the second electrical path in a determined fashion, said means to control including feedback means connected between the stages of the cascade and operable to control, in part, the conductive state of at least one of the first semiconductor switch means and the second semiconductor switch means.

11. Apparatus as claimed in claim 10 in which the first electrical terminal of the first stage of the cascade is connected to system ground and in which all other terminals and stages of the cascade float with respect to the system ground.

12. Apparatus as claimed in claim 10 in which the supply voltage means in each stage, except the first stage, is a capacitor, the second terminal of the first stage being connected to a primary source of electrical energy, said primary source furnishing electrical energy to the system.

13. Apparatus as claimed in claim 12 in which the third electrical terminal of the first stage is connected to the first electrical terminal of the second stage, in which the third electrical terminal of the second stage is connected to the first electrical terminal of the third stage, and so forth to the Nth stage, one of said terminals of the Nth stage being the system output terminal.

14. Apparatus as claimed in claim 13 which includes diodes connected to pass current from stage to stage.

15. Apparatus as claimed in claim 14 in which the diodes are connected in a parallel configuration.

16. Apparatus as claimed in claim 10 in which the means to control further includes memory means connected to control, in part, the conductive state of at least one of the first semiconductor switch means and the second semiconductor switch means.

17. Apparatus as claimed in claim 16 in which the supply voltage means is a storage capacitor in each stage except the first stage, said apparatus further including a system power supply, diode means connected between stages to permit charging current to pass from stage to stage during one state of system operation, and said memory means in addition to controlling the conductive state of at least one of the first semiconductor switch means and the second semiconductor switch means, acting to effect charging by ripple charging.

18. An electric system as claimed in claim 10 in which each stage includes a diode connected between the third electrical terminal and the first electrical terminal, the diode being connected to pass electric current serially from the third electrical terminal, through the second semiconductor switch means to the first electrical terminal.

19. An electric system as claimed in claim 10 in which the supply voltage means comprises a capacitor and which includes ripple charging means to charge the capacitor of one stage from the capacitor of the next preceding stage.

20. An electric system that comprises, in combination, a plurality of supply voltage elements connected in cascade, semiconductor switch means connected between the elements of the cascade for switching the elements from a series mode to a parallel mode and vice versa and to bypass said elements, and feedback means connected in a bootstrap configuration to control, in part, switching of the semiconductor switch means.

21. An electric system comprising a plurality of stages connected in cascade, each stage including, in combination, supply voltage means, solid-state switch means, and feedback means connected between stages to control, in part, the semiconductor switch means in each stage, thereby to connect the supply voltage means in series and in parallel as alternate states of system operation and to bypass said supply voltage means in a determined fashion.

22. An electric system that comprises a plurality of stages connected in cascade, each stage including: a first electrical terminal, a second electrical terminal and a third electrical terminal, supply voltage means connected between the first electrical terminal and the second electrical terminal, first transistor switch means connected in a first electrical path between the second electrical terminal and the third electrical terminal, second transistor switch means connected in a second electrical path between the first electrical terminal and the third electrical terminal, and a diode connected to conduct from the third electrical electrical terminal through the second transistor switch means to the first electrical terminal.

23. An electric system as claimed in claim 22 in which the switch means in each stage comprises a first transistor and a second transistor and which further includes a diode connected between said third electrical terminal and the second transistor, the diode being connected to pass electric current in the forward direction of diode current flow from the third electrical terminal to the second transistor and thence to the first electrical terminal of the stage.

* * * * *